United States Patent
Lutz et al.

(10) Patent No.: US 8,876,399 B2
(45) Date of Patent: Nov. 4, 2014

(54) SUSPENSION STRUT BEARING

(71) Applicant: Schaeffler Technologies AG & Co. KG, Herzogenaurach (DE)

(72) Inventors: Rainer Lutz, Markt Erlbach (DE); Ralf Stautner, Nuremberg (DE); Andreas Woellner, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/933,558

(22) Filed: Jul. 2, 2013

(65) Prior Publication Data

US 2014/0010491 A1    Jan. 9, 2014

(30) Foreign Application Priority Data

Jul. 3, 2012   (DE) .......................... 10 2012 211 457

(51) Int. Cl.
| F16C 19/16 | (2006.01) |
| F16C 33/78 | (2006.01) |
| F16C 19/10 | (2006.01) |
| F16C 35/07 | (2006.01) |

(52) U.S. Cl.
CPC ................. *F16C 19/10* (2013.01); *F16C 35/07* (2013.01); *F16C 19/16* (2013.01); *F16C 33/7886* (2013.01)

USPC .......................................... 384/611; 384/607

(58) Field of Classification Search
USPC ........... 384/420, 590, 607, 609, 611; 267/220
See application file for complete search history.

(56) References Cited

U.S. PATENT DOCUMENTS

| 5,110,223 A * | 5/1992 | Koch et al. .................... 384/620 |
| 6,814,496 B2 * | 11/2004 | Beghini et al. ................ 384/617 |
| 8,506,171 B2 * | 8/2013 | Stautner et al. ............... 384/607 |
| 2011/0311177 A1 * | 12/2011 | Viault et al. .................... 384/607 |
| 2012/0257849 A1 * | 10/2012 | Corbett et al. ................ 384/607 |

FOREIGN PATENT DOCUMENTS

| DE | 10 2006 057 559 A1 | 6/2008 |
| WO | WO 2008/068179 | 6/2008 |

* cited by examiner

*Primary Examiner* — Thomas R. Hannon
(74) *Attorney, Agent, or Firm* — Davidson, Davidson & Kappel, LLC

(57) ABSTRACT

A suspension strut bearing including a cap (2) and a guide ring (3) mounted for rotation relative to the cap (2) about an axis of rotation (D) and further including at least one seal (10), a thrust bearing (4) being arranged between the cap (2) and the guide ring (3). The cap (2) includes respective centering elements (15, 16) on an inner diameter and on an outer diameter, which centering elements (15, 16) enable an introduction of force into the cap (2).

7 Claims, 1 Drawing Sheet

SUSPENSION STRUT BEARING

This claims the benefit of German Patent Application DE 10 2012 211 457.2, filed Jul. 3, 2012 and hereby incorporated by reference herein.

The invention concerns a suspension strut bearing for use in suspension struts.

BACKGROUND

Suspension strut bearings are a part of the wheel suspension in single wheel suspensions. The suspension of wheels contributes to a desired driving safety and driving comfort as also to easy and precise steering of the wheels. The wheel suspension must keep roadway noises away from the car body and must be as light as possible. Depending on the structure, the suspension strut bearing guides the shock absorber spring and constitutes a support surface for the shock absorber end stop. The suspension strut bearing takes up the radial and axial forces transmitted through the shock absorber spring or shock absorber and acts such that during steering movements and spring deflection, the shock absorber spring turns with low friction and free of faulty gripping and thus operates without a righting moment.

Suspension strut bearings often form a part of so-called McPherson suspension struts. The suspension strut is made up substantially of a spring, a shock absorber and an axle stub. The suspension strut bearing comprises a cap that is fixed on the chassis side dome as well as a guide ring on which the shock absorber spring is supported and through which the shock absorber spring is guided. The guide ring is mounted for rotation relative to the cap. The bearing enables a turning of the spring relative to the car body during steering movements because the entire suspension strut rotates during these movements.

DE 10 2006 057 559 A1 discloses a suspension strut bearing comprising a cap and a guide ring that is rotatable relative to the cap. A thrust bearing is arranged between the cap and the guide ring. A sealing element is made in one piece with the cap and extends on the inner and on the outer periphery of the cap. The sealing element is configured in the form of sealing lips.

SUMMARY OF THE INVENTION

It is an object of the present invention to provide a suspension strut bearing that has a simple structure and can be manufactured at low costs.

The present invention provides a suspension strut bearing comprising a cap and a guide ring that is mounted for rotation relative to the cap about an axis of rotation, and further comprising at least one seal, a thrust bearing being arranged between the cap and the guide ring, and wherein the cap comprises respective centering elements on an inner diameter and on an outer diameter, which centering elements enable an introduction of force into the cap.

Suspension strut bearings comprise a cap and a guide ring that is connected, secure against loss, to the cap through a snap connection. A bearing is arranged between the cap and the guide ring. This bearing can be configured as a thrust bearing or a radial bearing and also as a sliding bearing or a rolling bearing.

With the help of the cap, the suspension strut bearings are fixed on the chassis side suspension strut dome or the top mount. The suspension strut bearings are centered either on the inner diameter or on the outer diameter and are then pressed into the top mount.

The suspension strut bearing of the invention comprises a cap that comprises centering elements on an inner diameter as well as on an outer diameter. With the help of the centering elements it is possible, depending on the installation situation, to center and to press in the suspension strut bearing optionally on the inner diameter or on the outer diameter. This has the advantage of enabling a flexible fixing of the suspension strut bearing in the top mount. Costs that would be necessary for re-construction or design modification of the suspension strut bearing for matching the suspension strut bearing to the installation situation do not occur, In a preferred embodiment of the invention, the centering elements are made in one piece with the cap. The centering elements are constituted by a plurality of protruding elements arranged in spaced relationship over the periphery. In a one-piece configuration of the centering elements with the cap, the centering elements and the cap can be made of the same material so that a low-cost and simple manufacturing is enabled. However, it is also imaginable to configure the centering elements separately and connect them through positive engagement, fusion of materials or force locking to the cap. Moreover, the centering elements and the cap may be made out of the same or out of different materials. By the term "protruding elements" can be understood lugs, elevations, ribs, knobs and elements with rectangular, square or round cross-sections. Other configurations or shapes of the centering elements are also imaginable. The advantage of this is that forces acting from the outside on the suspension strut bearing can be taken up by the centering elements and introduced through these into the cap. As a result, the seal of the suspension strut bearing remains free of loads and is thus protected from damage.

Preferably, the cap is configured out of a two component part, which two component part comprises a hard component and a soft component. With the help of the two component part, the sub-assembly can be simplified and improved. The two component part is made, for instance, by a two component injection molding method in which the two components are connected to each other through fusion of materials.

In a further embodiment of the invention, the centering elements are arranged in the region of the hard component and configured in one piece with the hard component. Because the centering elements are connected to the hard component, forces applied from the outside can be introduced directly into the hard component. This has the advantage that the soft component is not exposed to any influence from a force so that a deformation of the soft component can be avoided. Alternatively, it is also conceivable to configure the centering element separately and to connect it to the hard component by positive engagement, force locking or fusion of materials. It is equally possible to make the centering element and the cap out of the same material or out of different materials.

Preferably, the hard component is a polyamide. However, it is also imaginable to use other plastic or metallic materials.

In one embodiment of the invention, the seal is configured with help of the soft component and can be arranged both on the inner diameter and on the outer diameter of the cap. The seal may be bush-shaped and comprise an end side sealing lip. The seal may also be arranged only on one of the inner periphery and the outer periphery of the cap. Further, it is possible to use a seal of any other shape and any other arrangement. The base material of the seal can be an elastomer or another plastic material possessing rubber-like properties. Irrespective of the positioning and centering of the suspension strut bearing relative to the sub-assemblies of the suspension strut, the seal permits a sealing relative to a counter sealing surface.

BRIEF DESCRIPTION OF THE DRAWINGS

One example of embodiment of the invention will be described in the following with reference to three appended figures.

DETAILED DESCRIPTION

Figure 1:
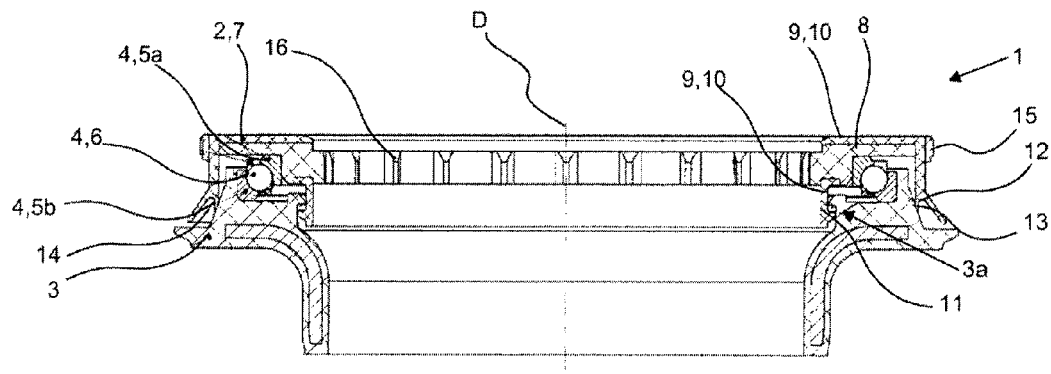
FIG. 1 shows a longitudinal section through a suspension strut bearing of the invention.

FIG. 1 shows a longitudinal section through a suspension strut bearing 1 of the invention. The suspension strut bearing 1 comprises a cap 2 as well as a guide ring 3 that is mounted for rotation relative to the cap 2 about an axis of rotation D. The cap 2 is connected with help of a snap connection 3a to the guide ring 3. The cap 2 is fixed on a dome bearing of a chassis of an automotive vehicle. The guide ring 3 receives an axial end of a shock absorber spring. Spring forces of the shock absorber spring are transmitted through the guide ring 3 into the cap 2 and from there into the dome bearing.

The guide ring 3 is mounted on the cap 2 axially in direction of the axis of rotation D through a thrust bearing 4. The thrust bearing 4 serves for the transmission of forces from the guide ring 3 acting on the cap 2 along the axis of rotation D. The thrust bearing 4 comprises a rolling element 6 mounted between two bearing rings 5a, 5b.

Figure 2:
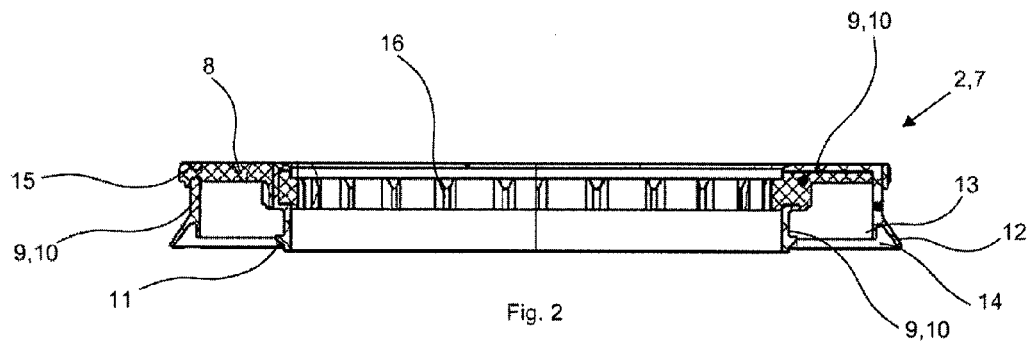
FIG. 2 shows a longitudinal section through a cap of the suspension strut bearing of the invention.
Figure 3:
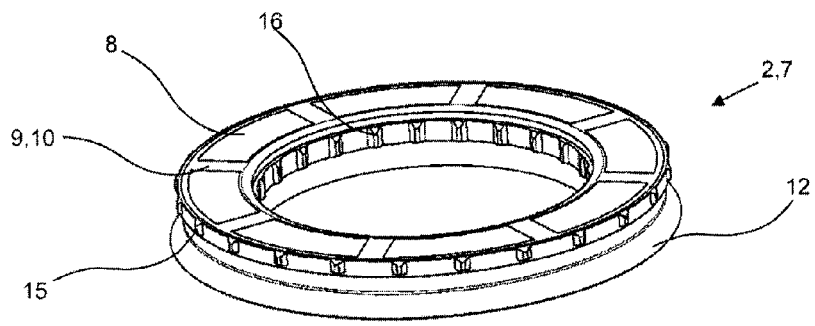
FIG. 3 shows a perspective view of the cap of the suspension strut bearing of the invention.

The structure of the cap 2 will now be described more closely with reference to FIGS. 2 and 3.

The cap 2 is configured as a ring-shaped two component part 7. The two component part 7 comprises a hard component 8 and a soft component 9. The two component part 7 is preferably made by a two component injection molding method in that the hard component 8 is pre-injected at first and the soft component 9 is then subsequently injected to thus form a connection by fusion of materials. As a hard component, it is possible, for example, to use a polyamide. The soft component is configured out of an elastomer. As can further be seen in the figures, the soft component 9 forms a partial coating of the hard component 8.

The soft component 9 forms the seal 10 of the suspension strut bearing 1. This seal 10 is configured on the inner periphery and on the outer periphery of the cap 2. On the inner periphery, the seal 10 is configured as a bush-shaped extension 11 that also forms a part of the snap connection 3a.

On the outer periphery of the cap 2, the seal 10 is configured as a bush-shaped extension comprising sealing lips 12, 13 on one end. The sealing lips 12, 13 protrude in axial direction from the suspension strut bearing 1. An annular empty space 14 is formed between the sealing lips 12, 13.

For positioning and centering the suspension strut bearing 1 relative to sub-assemblies, not shown, of the suspension strut, the cap 2 comprises on its inner periphery and on its outer periphery centering elements 15, 16. A plurality of these centering elements 15, 16 is arranged spaced over the periphery of the cap 2. The centering elements 15, 16 are formed through protruding elements having a rib-like shape. As viewed in cross-section, the centering elements 15, 16 have a triangular shape.

In the region of the hard component 8, the centering elements 15, 16 are made in one piece with the hard component 8. The centering elements 15, 16 take up forces acting from the outside, e.g. forces created by the pressing-in step, and transmit these forces to the hard component 8 of the cap 2. As a result of this, the seal 10 or the soft component 9 can be protected from deformation.

LIST OF REFERENCE NUMERALS

D Axis of rotation
Suspension strut bearing
Cap
Guide ring
3a Snap connection
Thrust bearing
5a Bearing ring
5b Bearing ring
6 Rolling element
7 Two component part
8 Hard component
9 Soft component
10 Seal
11 Bush-shaped extension
12 Sealing lip
13 Sealing lip
14 Hollow space
15 Centering element
16 Centering element

What is claimed is:

1. A suspension strut bearing comprising:
a cap having an inner diameter, an outer diameter, first centering elements on the inner diameter and second centering elements on the outer diameter, the first and second centering elements enabling an introduction of force into the cap;
a guide ring mounted for rotation relative to the cap about an axis of rotation;
at least one seal on the cap; and
a thrust bearing being arranged between the cap and the guide ring.

2. The suspension strut bearing as recited in claim 1 wherein the centering elements are configured in one piece with the cap and formed by a plurality of protruding elements arranged spaced from one another along a periphery of the cap.

3. The suspension strut bearing as recited in claim 1 wherein the cap includes a first component and a second component that are integrally joined together, the first component being harder than the second component.

4. The suspension strut bearing as recited in claim 3 wherein the first and second centering elements are arranged in a region of the first component and are configured in one piece with the first component.

5. The suspension strut bearing as recited in claim 3 wherein the first component is a polyamide.

6. The suspension strut bearing as recited in claim 3 wherein the second component configures the seal so that the seal is defined as part of the cap, the seal being arranged both on the inner diameter and on the outer diameter of the cap.

7. The suspension strut bearing as recited in claim 3 wherein the second component is an elastomer.

* * * * *